C. B. HALL.
STEERING ATTACHMENT FOR AUTOMOBILE LAMPS.
APPLICATION FILED NOV. 1, 1913.

1,114,136.

Patented Oct. 20, 1914.

WITNESSES:
Charles Rokles
Thos Eastberg

INVENTOR
Charles B. Hall,
BY G. H. Strong
ATTORNEY

UNITED STATES PATENT OFFICE.

CHARLES B. HALL, OF OAKLAND, CALIFORNIA, ASSIGNOR TO OSCILLATING LIGHT CO., INC., OF OAKLAND, CALIFORNIA, A CORPORATION OF CALIFORNIA.

STEERING ATTACHMENT FOR AUTOMOBILE-LAMPS.

1,114,136. Specification of Letters Patent. Patented Oct. 20, 1914.

Application filed November 1, 1913. Serial No. 798,653.

*To all whom it may concern:*

Be it known that I, CHARLES B. HALL, a citizen of the United States, residing at Oakland, in the county of Alameda and State of California, have invented new and useful Improvements in Steering Attachments for Automobile-Lamps, of which the following is a specification.

This invention relates to a steering attachment for automobile or other vehicle lamps.

The object of the present invention is to provide a simple, substantial, easily attached mechanism, which is so constructed and connected that it will cause the lamp brackets and lamps to vary their angularity concurrently with the variation of the angularity of the steering wheels, thus turning the lamps so that the light rays will always be projected upon that portion of the roadway which is immediately in the line of travel being followed.

Another object of the invention is to provide a mechanism with various adjustable parts to permit its attachment to vehicles of various sizes and makes.

Further objects will hereinafter appear.

The invention consists of the parts and the construction of parts as hereinafter more fully described and claimed, having reference to the accompanying drawings in which—

Figure 1:
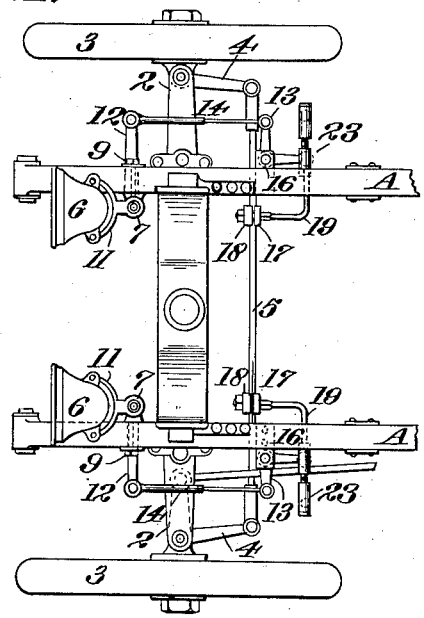
Figure 3:
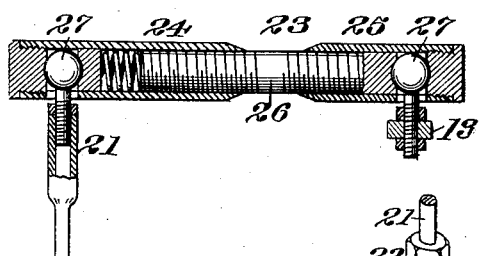
Figure 2:
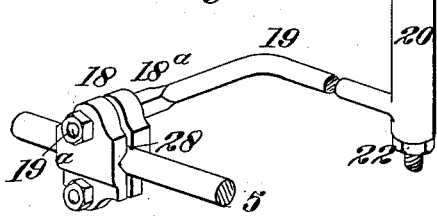
Figure 4:
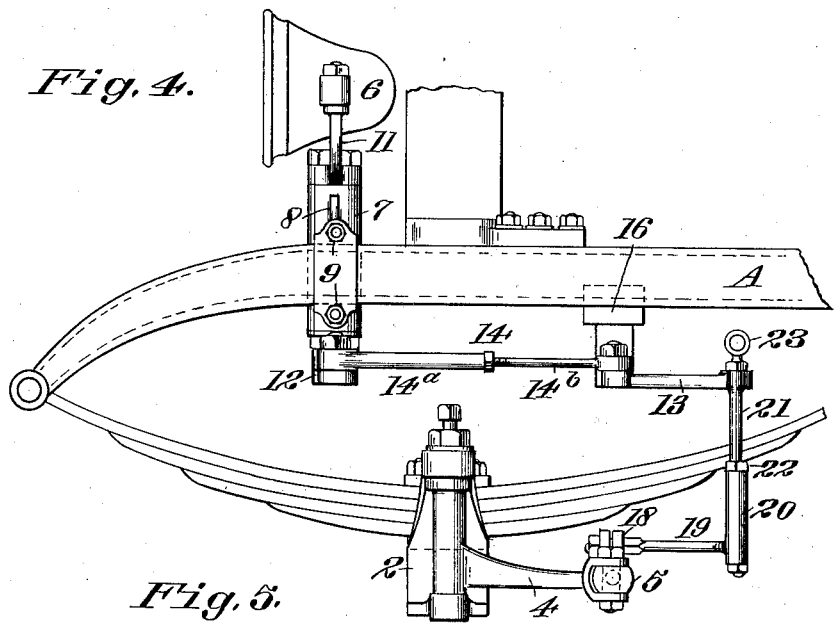
Figure 5:
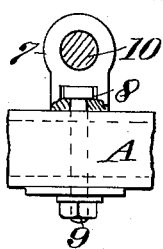

Figure 1 is a plan view showing the application of the invention. Fig. 2 is a perspective view showing the attachment of the extension angle-bracket to the tie-rod. Fig. 3 is a longitudinal section through the connecting link. Fig. 4 is an enlarged side elevation, showing the connected mechanism interposed between the tie-rod and lamp bracket. Fig. 5 is a cross section of the lamp socket.

Referring to the drawings, A indicates the vehicle frame, 2 the front axle, 3 the front wheels, 4 the steering knuckle crank arms, and 5 the tie-rod connecting same. The front lamps 6 are in this instance independently connected through a series of links and crank-arms with the tie-rod 5 so as to move the lamps in unison with same. This connected link and crank mechanism can be traced as follows: By referring to Fig. 1 it will be seen that each lamp turning attachment is similar. The specification will, therefore, be limited to the operation of the left-hand lamp. 7 indicates a socket member provided with a T-shaped slot 8 on its inner face, through which the heads of bolts 9 may be passed to secure same with relation to the frame A. 10 indicates a bolt turnably mounted in the socket member 7, and suitably secured to the upper end of same is a lamp bracket 11 in which the lamp 6 is mounted in the usual manner. Suitably secured on the lower end of the bolt 10 is a crank-arm 12, and pivotally connecting same with a bell-crank 13 is an adjustable link 14. The bell-crank 13 is pivotally secured at 16 to the lower edge of the frame. Suitably secured to the tie-rod, as at 17, is a clamp 18 from which projects an angular shaped extension bracket 19. The bracket 19 has formed on its outer end an upwardly extended internally threaded sleeve 20. Turnably mounted within the same is a vertically positioned threaded rod 21 adapted to be locked with relation to the vertical sleeve 20 by nuts 22, and connecting the upper end of the rod 21 with the opposite arm of the bell-crank 13 is a link 23 which is more clearly shown by referring to the sectional view of Fig. 3. This link consists of a pair of internally threaded sleeves 24 and 25 and a threaded rod 26, which, in connection with the sleeves 24 and 25, forms a link the length of which may be changed to suit various conditions.

The outer ends of the link 23 are provided with socket joint connections 27 which are adapted to be secured to the bell-crank and vertical rod 21, as shown. The socket joint connections 27 are provided for the purpose of permitting play between the frame A and the angle bracket 19 which is secured to the tie-rod. The angle bracket 19 is more clearly shown by referring to Fig. 2.

The clamp proper 18 is provided with a diamond-shaped groove 28 permitting it to be attached and securely clamped to practically any size rod. One side of the clamp, as 18$^a$, is provided with a square hole, and the inner end of the bracket 19 is similarly square to prevent any twisting movement of the bracket 19 with relation to the clamp. The opposite side of the clamp 18 is provided with a round opening through which the extreme threaded end 19$^a$ of the bracket 19 is permitted to be passed. By turning the nut 17 it can easily be seen that the bracket 19 may be securely fastened and positively prevented from twisting movement. The clamp constructed as here shown will thus act both as a clamp and bracket attachment in a single unit, being both substantial in construction and easily attached to any size rod.

The link 14 connecting the bell-crank 13 and crank-arm 12 consists of two parts 14$^a$ and 14$^b$, one part telescoping or threading into the other. This attachment permits the link 14 to be lengthened or shortened to suit various sizes and makes of vehicles. The T-shaped slot provided on the socket member 7 permits the socket member to be raised or lowered with relation to the frame, thus making it possible to attach the device to practically any vehicle.

In operation, it can readily be seen that any movement of the tie-rod to turn the steering wheels 3 will instantly be transmitted through bracket 19, with connected cranks, links and socket bolt 10 to which the lamp is secured, thus causing the lamp to turn in unison with the steering wheels and causing the light rays to be cast or projected ahead of the automobile or other vehicle and upon that portion of the roadway which it is desired to traverse.

A mechanism constructed as here shown is simple in construction and reliable in operation and by being provided with the several adjustable connections it becomes possible to attach the device to practically all sizes and makes of cars. The materials and finish of the several parts of the mechanism are such as experience and judgment of the manufacturer may dictate.

Having thus described my invention, what I claim and desire to secure by Letters Patent is—

In combination with a vehicle frame and the tie rod connecting the steering knuckles, a rotatable lamp, a bell crank pivoted to the frame, a connection between the lamp and one arm of the bell crank, a bracket having one end rigidly connected to the tie rod, and having its opposite end angularly disposed and arranged to extend parallel and in spaced relation to the tie rod, a vertical sleeve extending upwardly from the opposite end of said bracket, a vertical rod adjustable in said sleeve, means for locking said rod relative to said sleeve, an adjustable link disposed between said rod and the other arm of the bell crank, said adjustable link being disposed approximately parallel to said tie rod, and connections between the ends of said link and said bell crank and vertical rod to allow the link to have vertical reciprocatory movement at its ends.

In testimony whereof I have hereunto set my hand in the presence of two subscribing witnesses.

CHARLES B. HALL.

Witnesses:
  JOHN H. HERRING,
  W. W. HEALEY.